Aug. 14, 1951
J. F. KIMBALL
2,564,111
VEHICLE PICKUP APPARATUS
Filed June 20, 1949
3 Sheets-Sheet 1
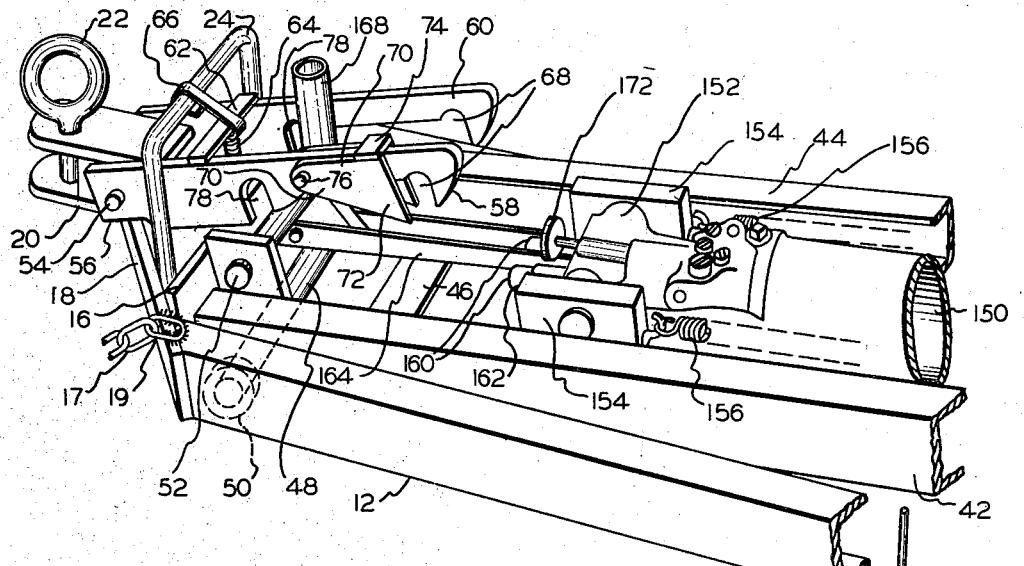
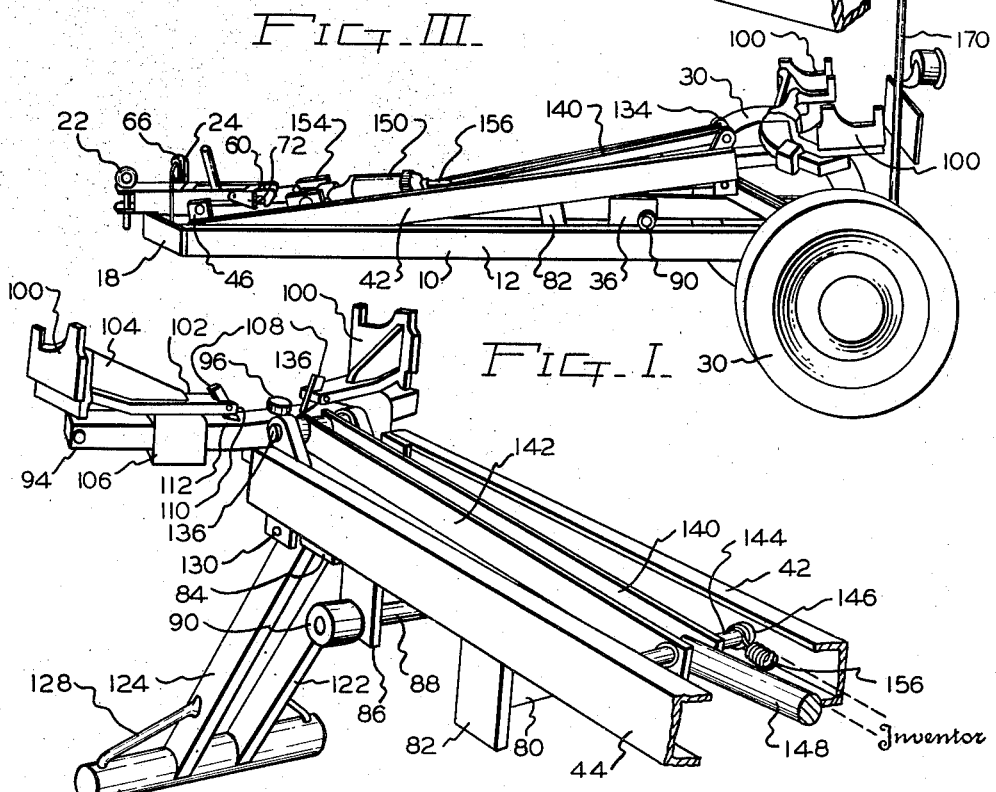
JAMES F. KIMBALL
By Bearman & Patch
ATTORNEYS Aug. 14, 1951
J. F. KIMBALL
2,564,111
VEHICLE PICKUP APPARATUS
Filed June 20, 1949
3 Sheets-Sheet 2
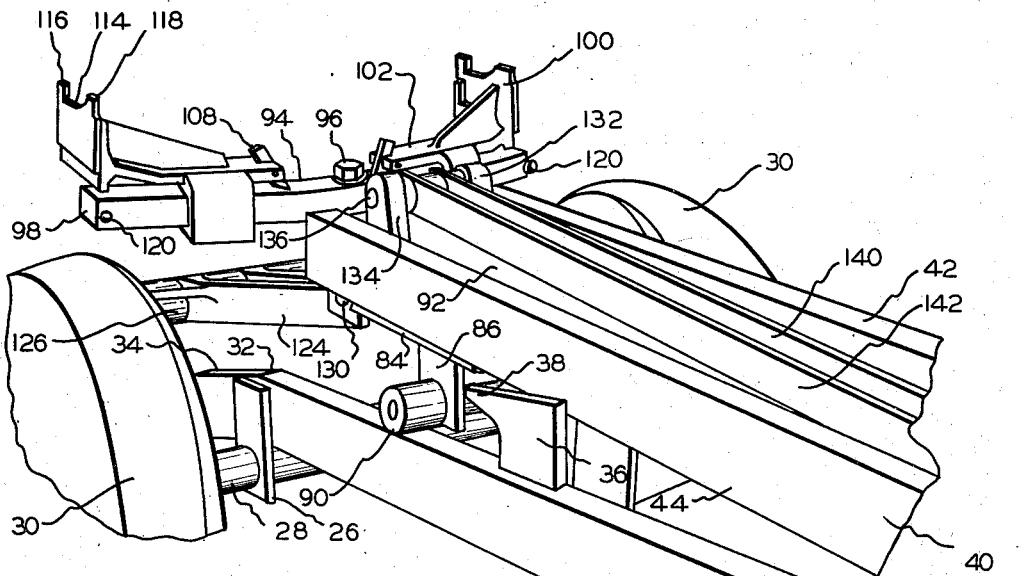
FIG. IV
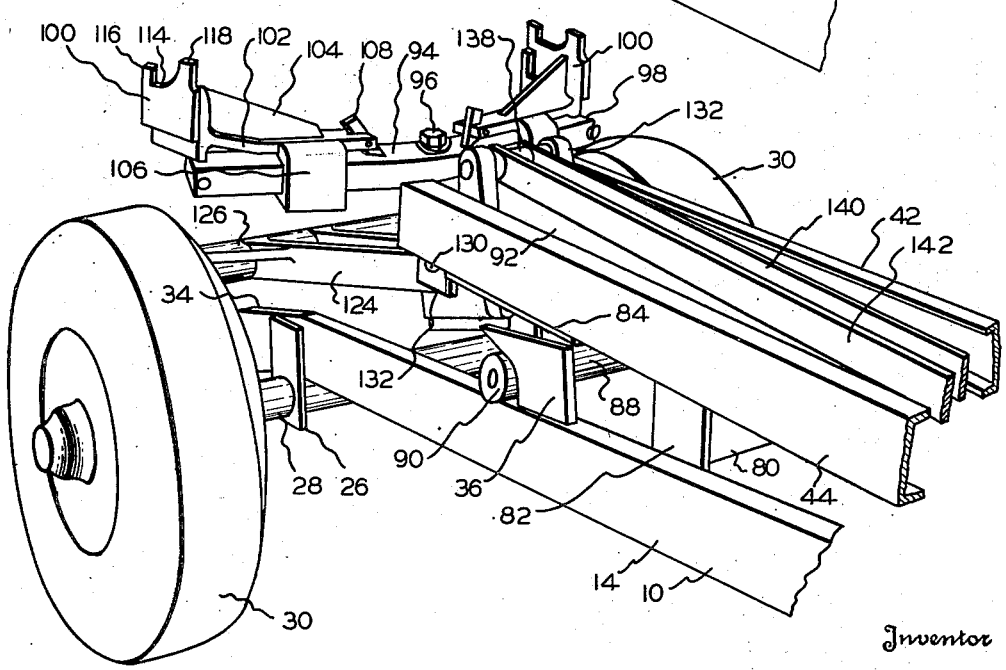
FIG. V
Inventor
JAMES F. KIMBALL
By Beaman + Patch
ATTORNEYS Aug. 14, 1951     J. F. KIMBALL     2,564,111
VEHICLE PICKUP APPARATUS
Filed June 20, 1949     3 Sheets-Sheet 3
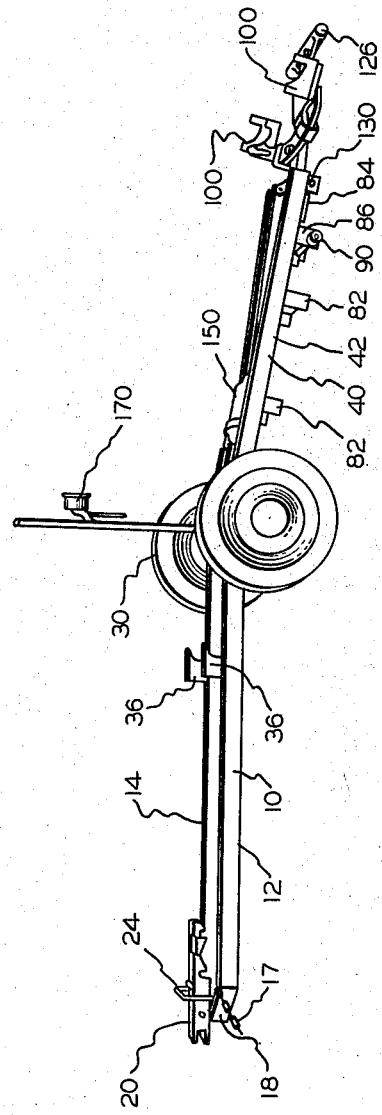
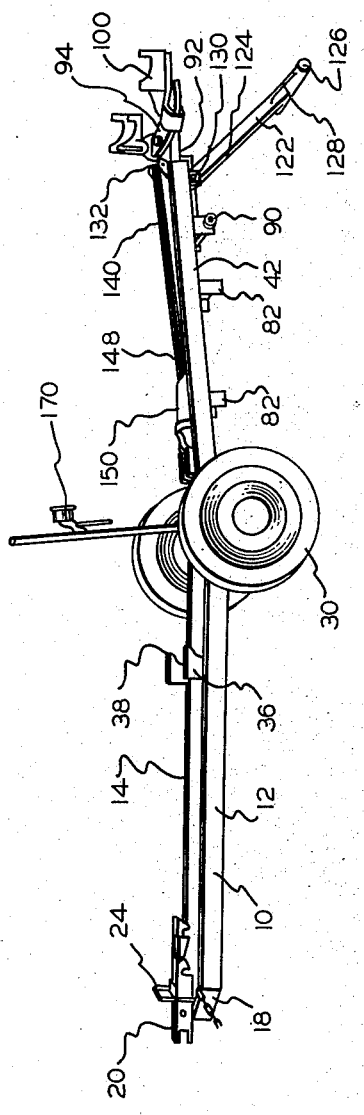
Inventor
JAMES F. KIMBALL
By Bearman & Patch
ATTORNEYS Patented Aug. 14, 1951

2,564,111

UNITED STATES PATENT OFFICE 2,564,111

VEHICLE PICKUP APPARATUS

James F. Kimball, Jackson, Mich.

Application June 20, 1949, Serial No. 100,289

4 Claims. (Cl. 214—86)

This invention relates to apparatus employed to lift and move a disabled vehicle such as an automobile, and more particularly to the provision of a light weight inexpensively constructed device which may be employed to lift and transport an automobile which, for some reason cannot be transported under its own power.

This invention is related to the invention disclosed in my co-pending application No. 758,419, filed July 1, 1947, now abandoned.

As related in the above mentioned co-pending application, apparatus usually employed to lift and move disabled automobiles has consisted primarily heretofore of some sort of a truck upon which a davit and boom is fitted, from which are swung various cables and chains used to lift the automobile. The automobile is then supported in any subsequent journey by the cable and chain. The objection to such a construction, particularly with the newer type of automobiles constructed with a long overhand at both ends, is that such equipment often causes extensive damage to the car being picked up and moved. At times the cable and chain will damage the paint and chrome finish on various parts. The use of a truck with a boom and cable often results in smashed grille work and head lights, not to mention twisted and sprung bumpers, frames and body panels, as well as some broken windows occasioned by the twisting action of the lifting.

It is, therefore, an object of this invention to provide a small trailer-like dolly which may be pulled behind any passenger automobile or light type of truck, when fitted with a suitable trailer hitch, and which may be used to lift and move disabled automobiles.

A further object is to provide a device which will lift and support a disabled automobile by means of the relatively rigid and substantial structure associated with that automobile, such as the front or rear axle or other heavy suspension member.

A further object is to provide a device for lifting and moving disabled vehicles which may be operated by one person, in positioning the device under the disabled vehicle, in lifting the disabled vehicle, in positioning the disabled vehicle for transporting, and for removing the vehicle from the device.

Further objects and advantages in my invention will be apparent from a consideration of the following specification, in connection with the appending claims and the accompanying drawings in which:

Fig. I is a perspective view of the left side of such a vehicle pick-up apparatus and showing the various parts in their contracted position, Fig. II is a perspective view showing the detail at the forward end of the vehicle pick-up apparatus particularly the power unit and the latch locking means, Fig. III is a broken perspective view showing the inner movable frame extended out from the stationary frame, not shown, and with the jack in its lowered position, Fig. IV is a broken perspective view showing the rear of the pick-up apparatus, with the parts assembled in the first locking position, Fig. V is a view similar to Fig. IV, but with the parts shown in the second locking position, Fig. VI is a view in perspective of the left side of the device, with the movable frame in the extended position and laying at the lower limit of its possible travel, and Fig. VII is a view similar to Fig. VI, but with the jack foot and arm extended to the lower position, thereby supporting the movable frame in its upper extended position.

The vehicle pick-up apparatus is constructed with a main or stationary frame 10 consisting of a pair of channel iron side rails, specifically the left side rail 12 and the right side rail 14. The rails 12 and 14 are of U-shaped cross section, for a purpose as will appear later, and are assembled with the open faces of the two rails facing each other. The forward end of the stationary frame 10 may be closed as by the plate 16, and carries a tie plate 18 forwardly thereof. Secured to the tie plate 18, is a trailer hitch 20 preferably having a locking pin 22.

The safety chains 17 may be attached to the forward ends of the rails 12 and 14 as by welding the links 19 in place, as shown especially in Fig. II. Likewise, other means may be used to attach the safety chains 17.

Attached to the forward end of the stationary frame 10, adjacent the plate 16 and the tie plate 18 is an U-shaped lifting handle 24 which is employed to maneuver the vehicle lifting apparatus as desired and to lift the forward end thereof when it is necessary to engage the hitch 22 with a mating hitch on an automobile.

The rearwardly directed ends of the side rails 12 and 14 are fitted with supporting plates 26 through which is mounted an axle 28 carrying a pair of wheel and tire assemblies 30. The rear extensions of the rails 12 and 14 are bent downwardly as at 32 and project in the downward extensions 34 for a distance behind the axle 28 for a purpose as will appear later.

The stationary frame 10 is provided with a pair of stop members 36 preferably welded on the upper flange of the rails 12 and 14, the stop members 36 having rearwardly extending shoulders 38.

The movable frame 40 is, likewise, constructed of U-sectioned channel iron and consists of the left rail 42 and the right rail 44. The rails 42 and 44 are spaced apart, as by the plate 46 and by other structure not shown. At the forward end of the movable frame 40 there is situated a pair of supports 46 through which is journalled a shaft 48, which in turn projects through the rails 42 and 44. The shaft 48 carries at its ends, outwardly positioned from the rails 42 and 44, a pair of small wheels or rollers 50, preferably mounted in extremely low friction bearings, and positioned for rolling movement within the channels of the rails 12 and 14. The wheels or rollers 50 thus support the forward end of the movable frame 40 as it moves relative to the stationary frame 10.

Likewise, mounted in the supports 46 and positioned above the shaft 48, is the locking shaft 52 which is secured against axial movement relative to the supports 46 by cotter pins as shown. The locking shaft 52 is thus secured to the forward end of the movable frame 40 such that restriction of movement of the locking shaft 52 will hold the movable frame 40 and its associated mechanism in a single position as desired.

Pivotally mounted on the shaft 54, held in position as by cotter pins 56 and mounted forwardly of the plate 16, as for instance through the rear end of the hitch 20, are the latch arms 58 and 60, held in parallel relationship by the tie plate 62 and urged in a downward direction by the latch spring 64. The hook latch 66 is provided to overcome the forces of the latch spring 64, so that the latch arms 58 and 60 may be held out of engagement with the locking shaft 52.

The latch arms 58 and 60 are provided, adjacent their free ends, with the notches 68 which are engageable with the locking shaft 52 in what is termed the first locking position. The latch arm 58 is provided with a pivoted latch lock 70 comprising a pair of plates 72 held in parallel relation by the tie plate 74 and mounted on the latch arm 58 by the pin 76. The ends of the plates 72 adjacent the notch 68 serve to engage one side of the locking shaft 52, thereby preventing longitudinal movement of the movable frame 40 in relation to the latch arms 58 and 60.

The latch arms 58 and 60 are, likewise, provided intermediate their pivoted ends and the notches 68, with a further pair of notches 78 which, likewise, function to grasp the locking shaft 52 and to prevent longitudinal movement of the movable frame 40 relative to the latch arms 58 and 60 and the stationary frame 10. The notches 78 define the second locking position.

It is recognized that various other types of latching and locking mechanism could be employed to prevent relative movement between the movable frame 40 and the stationary frame 10.

The movable frame 40 is formed with a number of transverse members 80, positioned below the rails 42 and 44, which in turn carry the vertical supports 82. The supports 82 are preferably not parallel to the longitudinal axis of the movable frame 40, but are assembled with a slight convergence at their forward ends, so that as the frame 40 is moved from the extended position shown in Fig. VII toward the contracted position shown in Fig. I, the members 82 will tend to center the movable frame 40 relative to the stationary frame 10 during the longitudinal sliding movement.

Positioned at the rear end of the movable frame 40 and fastened beneath the rails 42 and 44 is a heavy bolster plate 84 which carries the support members 86 through which is journalled a shaft 88 carrying a pair of rollers 90. The rollers 90 thereby support the rear end of the movable frame 40 above the stationary frame 10, and roll on the upper ends of the left and right rails 12 and 14, engaging the rails 12 and 14 on the sloped extension 34 thereof, and being prevented from forward movement beyond a predetermined point by reason of their engagement with the stop members 36. The rear end of the movable frame 40 is likewise prevented from moving in a vertical direction by reason of the overhanging shoulders 38 on the stop members 36.

The description thus far discloses a stationary frame 10, carried at its forward end by a trailer hitch 20, and at its rearward end by a pair of wheels 30. Mounted for longitudinal movement in relation thereto is a movable frame 40 supported at its forward end by the wheels or rollers 50 and at its rear end by the rollers 90, and releasably held in the contracted position relative to the stationary frame 10 by the stop members 36 and by the latching and locking arrangement.

Securely attached to the bolster plate 84, preferably by welding, is the bolster support 92 which extends rearwardly from the bolster plate 84. Pivotally mounted adjacent the rearmost end of the bolster support 92 is the bolster 94, being attached thereto by the bolt 96. It will be recognized that the bolster 94 will pivot about the bolt 96 to the extent allowed by possible interfering structure adjacent thereto. The bolster 94 may be of arcuate formation, in the plan view, with its outward ends 98 being positioned behind the bolt 96. The jaws 100 are attached to a support 102, and fitted with a brace 104. The support 102 forms one wall of a jaw box 106 which embraces the bolster 94, and permits the jaw 100 to be moved inwardly toward the bolt 96 and outwardly toward the end 98 of the bolster 94.

To resist inward movement of the jaw 100 toward the bolt 96, there is provided a cam lock 108 carried by an extension 110 of the support 102, and provided with a lower cam shaped edge 112, engageable with the bolster 94 to prevent relative movement therebetween.

Th jaw 100 is formed with a central supporting portion 114, a rearwardly positioned tooth or shoulder 116, and a forwardly positioned tooth or shoulder 118. The formation of the jaw 100 in this manner permits a relatively tight grip being obtained upon almost any part of the under structure of a motor vehicle.

The bolts 120 positioned near the ends 98 of the bolster 94 prevent the jaw boxes 106 coming off the bolster 94, but permit their removal when necessary.

As may be seen most clearly from a consideration of Figs. III, V and VII, the rear end of the movable frame 40 is provided with a lifting device situated substantially beneath the bolster 94 and the jaws 100, and comprising a pair of jack arms 122 and 124, joined together at their lower ends by a ground engaging shoe 126 and preferably being provided with a pair of braces 128. The jack arms 122 and 124 are pivotally mounted on the shaft 130 which is journalled in the supports 132, in turn secured to the side rails 42 and 44.

The jack arms 122 and 124 are bent adjacent the shaft 130 thereby providing a pair of upturned ends 132 and 134. Connecting the upper ends of the portions 132 and 134 is the shaft 136, which carries a number of spacing collars 138, and the rear ends of the ram links 140 and 142. The lifting device is thus formed so that rearwardly directed movement by the ram links 140 and 142 against the shaft 136 will pivot the jack arms 122 and 124 around the shaft 130, thereby causing the shoe 126 to contact the ground. Further power applied in a rearward direction to the ram links 140 and 142 will lift the rear end of the movable frame 40, together with the bolster 94 and the jaws 100 away from the ground, to a position as shown in Fig. VII.

The forward ends of the ram links 140 and 142 are supported by a shaft 144 which is provided at its outer end with a pair of rollers 146 positioned for longitudinal movement within the channels of the rails 42 and 44. The forward ends of the ram links 140 and 142 are thereby supported within the movable frame 40 and are allowed to move longitudinally in relation therewith to impart pivotal movement to the jack arms 122 and 124.

Longitudinal movement is imparted to the shaft 144 and thereby to the ram links 140 and 142 by the piston rod 148 projecting rearwardly from a hydraulic cylinder 150 which is in turn mounted on a trunnion 152, supported by the trunnion bearing plates 154 which are secured to the movable frame 40. The ram return springs 156 are provided to draw the shaft 144 forward relative to the movable frame 40, so that, as desired, the lifting member can be cleared from its ground engaging position.

Manual power is imparted to the piston rods 160 through the pin 162, which provides attachment means for the power links 164. The power links 164 extend forwardly and are attached to the lower side of a plate 166 which is pivotally mounted on the locking shaft 52 and which carries a pump handle socket 168. By placing a pump handle 170 in the socket 166, and by pivotally moving the same about the axis of the locking shaft 52, a pumping action is imparted to the power links 164 and in turn to the hydraulic cylinder 150, to the piston rod 148, and to the ram links 142, thereby pivotally moving the jack arms 122 and 124, which causes the lifting device to perform its lifting function. When it is desired to return the lifting device to its upper position, the release control knob 172, located near the forward end of the hydraulic cylinder 150, is actuated thereby reversing the flow of hydraulic fluid which allows the ram return springs 156 to pull the ram links 140 and 142 in a forward direction, thereby lifting the shoe 126 from its ground engaging position.

In operation, the vehicle pick-up apparatus is towed behind an automobile or light truck in the collapsed position as shown in Fig. I. Upon reaching the vehicle which must be lifted and moved, the apparatus is disconnected from the car by which it has been towed, the latch arms 58 and 60 are disengaged from the locking shaft 52, as shown in Fig. II, and the hook latch 66 is engaged to overcome the action of the latch spring 64. This release of the forward end of the movable frame 40 from its locking engagement with the stationary frame 52, permits the movable frame 40 to be drawn out to the extended position shown in Fig. VI. It will be found that, in this position, the device may be maneuvered into position by use of the handle 24. The maneuvering of the device is not difficult by reason of the fact that the weight is practically evenly balanced around the wheels 30, so that the jaws 100 may be positioned under the particular part of the supporting structure by means of which it is desired to lift the disabled vehicle. Upon positioning the jaws 100 as desired under the disabled vehicle, the pump handle 170 is placed in the socket 168, and power is applied to lift the rear end of the movable frame 40 by means of the jack arms 122 and 124 and the ground engaging shoe 126.

Upon completing the above operation, the tow car is again attached to the trailer hitch 20, and the rear end of the movable frame is lifted to the limit of its upward travel. The tow car is then backed toward the disabled vehicle, which causes longitudinal sliding of the movable frame 40 with respect to the stationary frame 10, the rollers 90 engaging the downwardly directed ends 34 of the side rails 12 and 14. It will be found that the rear end of the movable frame 40 has been raised so far as to keep the rollers 90 away from engagement with the side rails 12 and 14. The weight of the disabled vehicle and the movable frame 40 is then transferred to the main frame 10 by retracting the lifting jack by operating the relief control knob 172.

The towing car is then backed up sufficiently to place the parts in the contracted or first locking position, as shown in Fig. IV, wherein the locking shaft 52 will be engaged by the notches 68. If possible, it is desirable to position the members such that the parts are contracted into the second locking position, as shown in Fig. V, wherein the rollers 90 are in engagement with the stop members 36, and the notches 78 of the latch arms 58 and 60 are engaged over the locking shaft 52. The releasing of the hook latch 66 will securely engage the latch locking mechanism with the locking shaft 52, thereby permitting the pulling of the disabled vehicle.

The releasing of the disabled vehicle from the vehicle lifting and moving apparatus is accomplished by reversing the procedure above described for loading the vehicle on the apparatus.

It is recognized that certain changes may be made without departing from the spirit of the invention as described above, and it is desired to claim and protect by Letters Patent the following:

1. In a trailer type vehicle for lifting and moving another vehicle and having a main frame supported by a plurality of ground engaging wheels and hitch means for attaching the same to a towing vehicle, the provision of a lifting and carrying structure comprising a movable frame mounted on said main frame and adapted to be contracted therewith and extended rearwardly therefrom, said movable frame being mounted for pivotal movement in a vertical plane relative to said main frame, locking means associated with said movable frame to retain the same in a selected position relative to said main frame, a vehicle supporting jaw equipped bolster pivotally mounted on said movable frame adjacent its rear end, and lifting means mounted on the rear end of said movable frame adjacent said bolster and adapted selectively to impart vertical movement to the rear end of said movable frame and said bolster.

2. A vehicle lifting and moving device comprising a main frame, a plurality of wheels attached to said main frame and supporting the same, a movable frame associated with said main frame and extendable therefrom, said movable frame being supported by said main frame when the two frames are in their contracted position and only partially supported by said main frame when the movable frame is fully extended from said main frame, said movable frame having a pivotal connection with said main frame such that the rear end of the movable frame may be lifted and lowered when the movable frame is in the extended position, a latch for releasably holding the said frames in their contracted position, a vehicle engaging and supporting bolster mounted on the rear end of said movable frame and engageable with a vehicle when said movable frame is fully extended from said main frame, and a vehicle lifting jack mounted on the rear end of said movable frame for lifting said bolster, the rear end of said frame and a disabled vehicle to such a height that the main frame may be moved back into the contracted position with said movable frame and the weight on said movable frame transferred to said main frame.

3. A vehicle lifting and moving device adapted to be towed by a vehicle and partially supported thereby comprising a wheel supported main frame, a movable frame supported for longitudinal sliding movement by said main frame, a latch for releasably holding said frames in their contracted position, a vehicle engaging and supporting member mounted on said movable frame adjacent the rear end thereof, and lifting means mounted on said movable frame and operable to lift the rear end of said movable frame and a vehicle carried thereby to a height such that said main frame may be longitudinally moved into its contracted position relative to said movable frame and the weight carried by said movable frame and said lifting means transpired to said main frame.

4. In a vehicle lifting and moving device adapted to be towed by a vehicle and having a wheel supported main frame, a movable frame supported by said main frame for longitudinal movement relative to said main frame and for pivotal movement in a vertical plane relative to said main frame, and vehicle engaging and supporting apparatus mounted on said movable frame, the provision of lifting means adaptable to lift and support the rear end of said movable frame and comprising a jack arm pivotally mounted on said movable frame, a ground engaging portion associated with one end of said jack arm, and a power supplying arm associated with the other end of said jack arm such that movement of said power supplying arm in a substantially horizontal direction will pivot said jack arm, causing said ground engaging portion to contact the ground and to lift the rear end of said movable frame.

JAMES F. KIMBALL.

REFERENCES CITED

The following references are of record in the file of this patent:

UNITED STATES PATENTS

| Number | Name | Date |
|---|---|---|
| 1,402,074 | Kloehn | Jan. 3, 1922 |
| 1,408,002 | Heymoss | Feb. 28, 1922 |
| 1,560,071 | Baker | Nov. 3, 1925 |
| 1,725,952 | Beebe | Aug. 27, 1929 |
| 1,739,364 | Lake | Dec. 10, 1929 |
| 2,111,341 | Tetrault | Mar. 15, 1938 |

FOREIGN PATENTS

| Number | Country | Date |
|---|---|---|
| 664,920 | Germany | Sept. 13, 1938 |